W. L. HOOKER.
POWER TRANSMITTING MEANS.
APPLICATION FILED DEC. 19, 1914.
1,270,825.
Patented July 2, 1918.
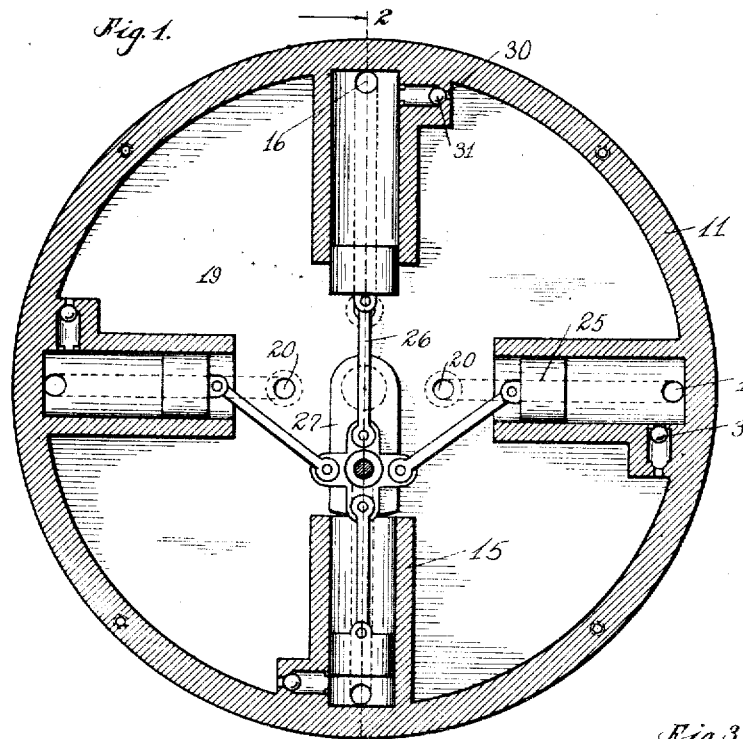
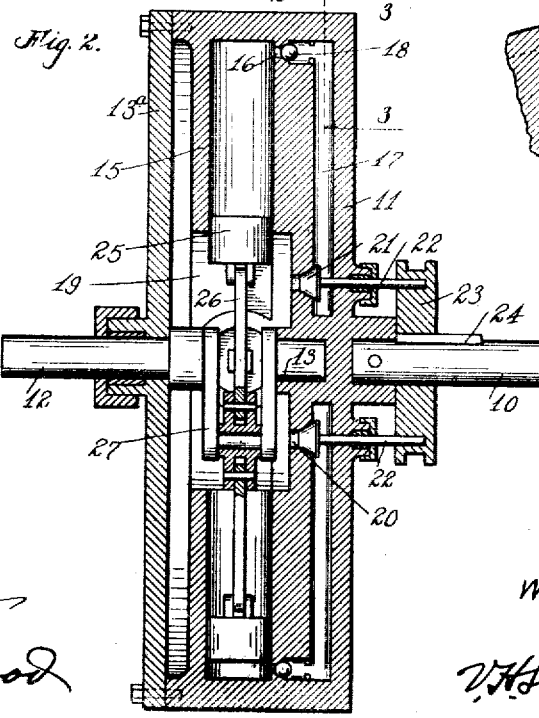
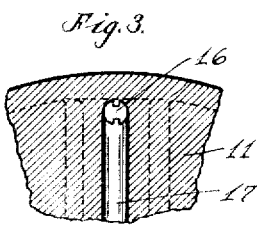
WITNESSES:
INVENTOR
Willis L. Hooker
BY
ATTORNEY

UNITED STATES PATENT OFFICE.

WILLIS L. HOOKER, OF SCOTTSBURG, INDIANA, ASSIGNOR OF ONE-NINTH TO JAMES HOOKER, OF INDIANAPOLIS, INDIANA.

POWER-TRANSMITTING MEANS.

1,270,825.

Specification of Letters Patent.

Patented July 2, 1918.

Application filed December 19, 1914. Serial No. 878,161.

*To all whom it may concern:*

Be it known that I, WILLIS L. HOOKER, a citizen of the United States, and a resident of Scottsburg, county of Scott, and State of Indiana, have invented a certain new and useful Power-Transmitting Means; and I do hereby declare that the following is a full, clear, and exact description thereof, reference being had to the accompanying drawings, in which like letters refer to like parts.

This invention relates to that class of variable speed transmission mechanisms wherein the power is transmitted through dash pot constructions, means being provided for the regulating displacements of the dash pots in order to vary the speed.

The chief feature of this invention consists in providing on either the driving shaft or the driven shaft, a wheel within which the dash pots are all mounted and operable, the plunger rods of said dash pots being connected with the crank on the other shaft. Said wheel has in it a liquid or oil chamber in communication with a central chamber, and the passage between said central chamber, and said communicating passageways or chambers are controlled by valves or means adapted to be adjusted by hand.

With this construction, the inner ends of all the dash pot cylinders may be open and no packing is needed at such points and, therefore, all the strain of the plungers and fluid contents of the dash pot cylinders is resisted by the external periphery of the wheel which is solid and strong.

The full nature of the invention will be understood from the accompanying drawings and the following description and claim:

In the drawings, Figure 1 is a central transverse section through the device. Fig. 2 is a section on the line 2—2 of Fig. 1. Fig. 3 is a section on the line 3—3 of Fig. 2.

In the drawings there is shown a driving shaft 10 which has secured rigidly on it a wheel 11. The driven shaft 12 is in alinement with the driving shaft 10 and its inner end operates in a bearing at 13 in what may be considered the hub of the wheel 11.

The wheel 11 is hollow, the rim being overhanging and, therefore, one side of the wheel is open and adapted to be closed by a plate 13ª in the center of which the driven shaft 12 also has bearing.

The wheel 11 has at intervals within it, four equidistant dash pot cylinders 15 extending from the rim radially inward for about half the radius and being open at their inner ends. The outer ends of these dash pot cylinders have ports 16 communicating with the radially disposed conduits 17 and the ports 16 are closed by ball or check valves 18. Near the inner ends of the radial conduits 17 there are ports 20 communicating with the central portion of the main chamber 19 within said wheel 11, said ports being tapered or funnel shaped for a part of their length. The ports 20 are controlled by the valves 21 on valve stems 22 which are parallel with the shafts and extend through the wall of the wheel 11 and are secured to a block 23 slidable on the shaft 10 by means not here shown, and keyed to said shaft by a key 24 so as to rotate with said shaft and the wheel 11. The valves 21 are substantially conical to fit the taper of ports 20, the tapering of said ports providing a more gradual and minute adjustment of said ports in relation to each other.

The plungers 25 in said dash pot cylinders have pitman or connecting rods 26, all of which are pivoted to a crank 27 on the driven shaft 12 so that said driven shaft 12 is a crank shaft. Said crank 27 operates in the central portion of the chamber 19.

The outer ends of the cylinders 15 are also provided with ports 30 which are controlled by means of check valves 31, the ports 30 having seats at their outer ends for coöperation with the check valves while the ports 16 have seats adjacent their inner ends for coöperation with the check valves 18. The ports 30 communicate directly with the chamber 19 so that when the pistons start on their inward stroke the valves 31 are opened and oil is drawn into the cylinders 15 and as the ports 16 are substantially at right angles to the ports 30 and at the same end of the cylinder, the check valves 18 will be closed during the inward movement of the pistons. When the piston starts on its out stroke the operation of the valves is reversed, that is the valve 31 will be closed and the valve 18 opened, thus permitting the oil within the cylinder to pass through said port into conduit 17 and escape through the port 20 providing the valve 21 is open.

As best shown in Fig. 2 of the drawings the cylinders 15 are integral with the stationary face of the wheel 11 and the conduits 17 are formed in the stationary wall of the wheel 11 and extend from the outer ends of the cylinders to a point beyond the inner ends of the cylinders and by locating the ports 20 adjacent the inner ends of said conduits the oil will leave the conduits at a point receiving the least resistance from the weight of the oil within the chamber 19 so that the passage of the oil from the ports 20 will not in any way be influenced by the quantity of oil within the chamber 19.

The operation of the device is as follows: When the parts are assembled, as shown in Fig. 2, the chamber 19 is provided with a proper supply of oil. As the driving shaft 10 is rotated, the wheel 11 revolves and as it revolves, the plungers in the dash pot cylinders operate and draw a supply of oil into the cylinders through ports 30. If the ports 20 are wide open so that the oil can freely flow from the dash pot cylinders through the passages 17 to the interior of the central chamber as fast as it is pumped into the cylinders through the ports 30, the device will transmit practically no power to the crank shaft 12, but will run idle. When, however, the block 23 is moved inward to cause the valves 21 to close partially the ports 20 and thus resist the free movement of the oil through the passageways 17 to the central chamber 19, power to a proportionate degree will be transmitted to the shaft 12 by the dash pot cylinders. In other words, when the valves are thus adjusted, the dash pot plungers will have a limited freedom of movement and since the oil cannot get out of their way rapidly, the resistance afforded to them will be transmitted from the wheel 11, which is revoluble through the plungers and pitman rods, to the driven shaft. If the block 23 be moved inward to its limit so as to close the ports 20 tightly and permit no circulation of the oil, the plungers 25 can have no movement at all and therefore, the power from the driving shaft will be wholly transmitted to the driven shaft and it will run at high speed.

Therefore, by adjusting the valves 21 through suitable lever mechanism, not shown, as one operates the machine, he can very sensitively control the speed from the maximum speed to the idle position. The valves 18 and 31 are in enlarged chambers, as shown, so that when they are in open position, fluid will pass therearound.

The invention is not limited to the exact construction shown for it is immaterial on which shaft the wheel 11 is secured. The device is simple because the dash pot cylinders require no caps and stuffing boxes for the pitman rods 26 and in fact the plungers can move partly out of the cylinders, as shown. The only resistance to their movement is the oil which is controlled in its movement by the valves 21, as desired. Nor is the invention limited to the crank 27, as any other equivalent means for transmitting power between the dash pot plungers and their associated shaft may be employed.

The invention claimed is:

Power transmitting means comprising a driving shaft, a driven shaft in alinement therewith, a wheel secured to one of said shafts and surrounding the other shaft, a crank in the latter shaft centrally located in said wheel, said wheel having a fixed wall and a removable wall, radially disposed dash pot cylinders integral with the fixed wheel and open at their inner ends, said fixed wall having radial conduits extending from the outer ends of said cylinders to a point beyond the inner ends thereof, said conduits having ports at their outer ends communicating with the outer ends of the cylinders, valves coöperating with said ports for preventing the return of the contents of the conduits into said cylinders, said conduits also having ports adjacent their inner ends communicating with the interior of said wheel, said latter ports being tapered a portion of their length, shafts extending transversely through said conduits, conical valves carried by said shafts for coöperation with said tapered seats of the inner set of ports, means to adjust said shafts longitudinally for controlling the passage of the contents of the conduits through the tapered ports, said cylinders also having at their outer ends ports communicating with the interior of the cylinders and the chamber in said wheel and valves coöperating with said ports to prevent the passage of oil from the interior of the cylinders through said latter ports into the chamber of the wheel.

In witness whereof, I have hereunto affixed my signature in the presence of the witnesses herein named.

WILLIS L. HOOKER.

Witnesses:
J. H. WELLS,
R. G. LOCKWOOD.